(12) United States Patent
Ramalingam et al.

(10) Patent No.: US 9,749,366 B1
(45) Date of Patent: Aug. 29, 2017

(54) AGGREGATED SOCIAL NETWORK

(75) Inventors: Harsha Ramalingam, Kirkland, WA (US); Bhavnish H. Lathia, Redmond, WA (US); Michael Carr, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 626 days.

(21) Appl. No.: 13/619,334

(22) Filed: Sep. 14, 2012

(51) Int. Cl.
*G06F 15/16* (2006.01)
*H04L 29/06* (2006.01)
*G06Q 50/00* (2012.01)

(52) U.S. Cl.
CPC .......... *H04L 65/403* (2013.01); *G06Q 50/01* (2013.01)

(58) Field of Classification Search
None
See application file for complete search history.

(56) References Cited

U.S. PATENT DOCUMENTS

| 8,549,279 B1 | 10/2013 | Sahasranaman et al. |
| 2005/0256764 A1 | 11/2005 | Beaumont et al. |
| 2009/0177744 A1* | 7/2009 | Marlow ............... G06Q 10/10 709/204 |
| 2009/0221312 A1* | 9/2009 | Franklin ............... H04L 51/38 455/466 |
| 2009/0240597 A1 | 9/2009 | Oswald |
| 2009/0276284 A1 | 11/2009 | Yost |
| 2010/0088246 A1 | 4/2010 | Lim |
| 2010/0146048 A1* | 6/2010 | Rothstein ............ G06F 17/3089 709/204 |
| 2010/0287256 A1 | 11/2010 | Neilio |
| 2011/0196926 A1* | 8/2011 | Crawford ............... G06Q 30/02 709/204 |

(Continued)

FOREIGN PATENT DOCUMENTS

| WO | WO 2012/057973 A2 * | 5/2012 | ............ G06F 17/40 |
| WO | WO 2012057973 A2 * | 5/2012 | ............ G06F 17/40 |

OTHER PUBLICATIONS

Final Office Action for U.S. Appl. No. 13/460,637, mailed on May 6, 2014, Harsha Ramalingam, "Liftable Friend Application", 33 pages.

(Continued)

*Primary Examiner* — Joseph E Avellino
*Assistant Examiner* — Phyllis A Book
(74) *Attorney, Agent, or Firm* — Lee & Hayes, PLLC

(57) ABSTRACT

This disclosure is generally directed to, at least in part, creating and maintaining an aggregated social network that provides access to data in other social networks. The aggregated social network may allow a user to view information from the other social networks while interacting in the aggregated social network. The aggregated social network may facilitate messaging with other social networks and across social networks, which may allow users that are not members of a same social network to exchange messages or other communications through direct or indirect use of the aggregated social network. The aggregated social network may build a directory of contacts based on data from the various social networks. The aggregated social network may create a routing infrastructure to enable the aggregated social network to be updated when aspects of the linked other social networks are updated with added content.

25 Claims, 9 Drawing Sheets

(56) References Cited

U.S. PATENT DOCUMENTS

| | | | |
|---|---|---|---|
| 2011/0219073 A1* | 9/2011 | Lawler | H04L 51/32 709/204 |
| 2011/0282942 A1 | 11/2011 | Berger et al. | |
| 2012/0079396 A1* | 3/2012 | Neer | G06Q 10/107 715/745 |
| 2012/0095881 A1 | 4/2012 | Rothman | |
| 2012/0096352 A1* | 4/2012 | Maor | H04L 51/32 715/706 |
| 2012/0174203 A1* | 7/2012 | Frank | G06F 21/31 726/7 |
| 2012/0226701 A1* | 9/2012 | Singh | G06F 21/40 707/748 |
| 2012/0232998 A1* | 9/2012 | Schoen | G06Q 10/10 705/14.66 |
| 2012/0284338 A1* | 11/2012 | Marlow | H04L 12/581 709/204 |
| 2012/0290659 A1* | 11/2012 | Rao | G06Q 30/08 709/204 |
| 2013/0031175 A1* | 1/2013 | Patel | G06Q 30/0201 709/204 |
| 2013/0073628 A1* | 3/2013 | Barber | G06F 21/31 709/204 |
| 2013/0191455 A1* | 7/2013 | Penumaka | 709/204 |
| 2013/0232038 A1 | 9/2013 | Murray | |
| 2013/0297523 A1 | 11/2013 | Karr et al. | |
| 2013/0332308 A1 | 12/2013 | Linden et al. | |

OTHER PUBLICATIONS

Office Action for U.S. Appl. No. 13/460,637, mailed on Dec. 19, 2013, Harsha Ramalingam, "Liftable Friend Application", 34 pages.

Office action for U.S. Appl. No. 13/460,637, mailed on Sep. 23, 2014, Ramalingam, et al., "Giftable Friend Application," 43 pages.

Final Office Action for U.S. Appl. No. 13/460,637, mailed on Jun. 24, 2015, Harsha Ramalingam, "Giftable Friend Application", 27 pages.

Office Action for U.S Appl. No. 13/460,637 mailed on Nov. 20, 2015, Ramalingam, et al., "Giftable Friend Application", 43 pages.

Office action for U.S. Appl. No. 13/460,637, mailed on Jul. 1, 2016, Ramalingam et al., "Giftable Friend Application", 71 pages.

\* cited by examiner

AGGREGATED SOCIAL NETWORK

BACKGROUND

Social networks provide software that enables users to create, share, and manage information about the user and the user's network of friends, family, colleagues, classmates, and other acquaintances. Social networking sites have become increasingly popular and account for a large portion of internet activity. Besides being a repository of information, some social networks have a platform that enables developers to create applications and other content for use by users. These applications operate like plug-in software and appear integrated with the social network from the user's viewpoint. Other social networks focus on message distribution by providing distribution of messages or posts to various users.

Several prominent companies have established social networks that have large customer bases, such as Facebook®, Linkedin®, Google+®, and Twitter®. However, these social networks are largely isolated from one another and require users to maintain separate accounts for each social network. Further, distribution of content of the social networks is often limited to publication within each respective social network. Thus, when a user desires to post a message about something she desires to share with her friends, she may have to post the message on more than one social network to ensure that all of her friends receive the posted message since some friends may be active in different social networks than other friends. In addition, the user may also have to monitor posted messages from friends by logging into multiple social networks to ensure that she did not miss some relevant information posted on one of the social networks.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is generally directed to, at least in part, creating and maintaining an aggregated social network that provides access to data in other social networks. In accordance with various embodiments, the aggregated social network may allow a user to view information from the other social networks while interacting in the aggregated social network. The aggregated social network may facilitate messaging with other social networks and across social networks, which may allow users that are not members of a same social network to exchange messages or other communications through direct or indirect use of the aggregated social network.

In various embodiments, the aggregated social network may build a directory of contacts based on data from the various social networks. The aggregated social network may create a routing infrastructure to enable the aggregated social network to be updated when aspects of the linked other social networks are updated with added content (e.g., posts, status updates, new attributes, user profile updates, etc.). The aggregated social network may create routing or links with the other social networks that enable the aggregated social network to provide updates or otherwise provide current information from the other social networks. The aggregated social network may also maintain its own repository of information.

In some embodiments, the aggregated social network may create and maintain a reputation score for users. The reputation score may be based partly on various factors, such as the user's membership in other social networks, the user's contacts, the user's activity level in the social networks, and so forth. The reputation score may be used to allocate or assign privileges (e.g., ability to perform additional tasks), to provide recommendations to the user, for advertising purposes, for fee arrangements, and so forth.

The techniques and systems described herein may be implemented in a number of ways. Example implementations are provided below with reference to the following figures.

Illustrative Environment

Figure 1:
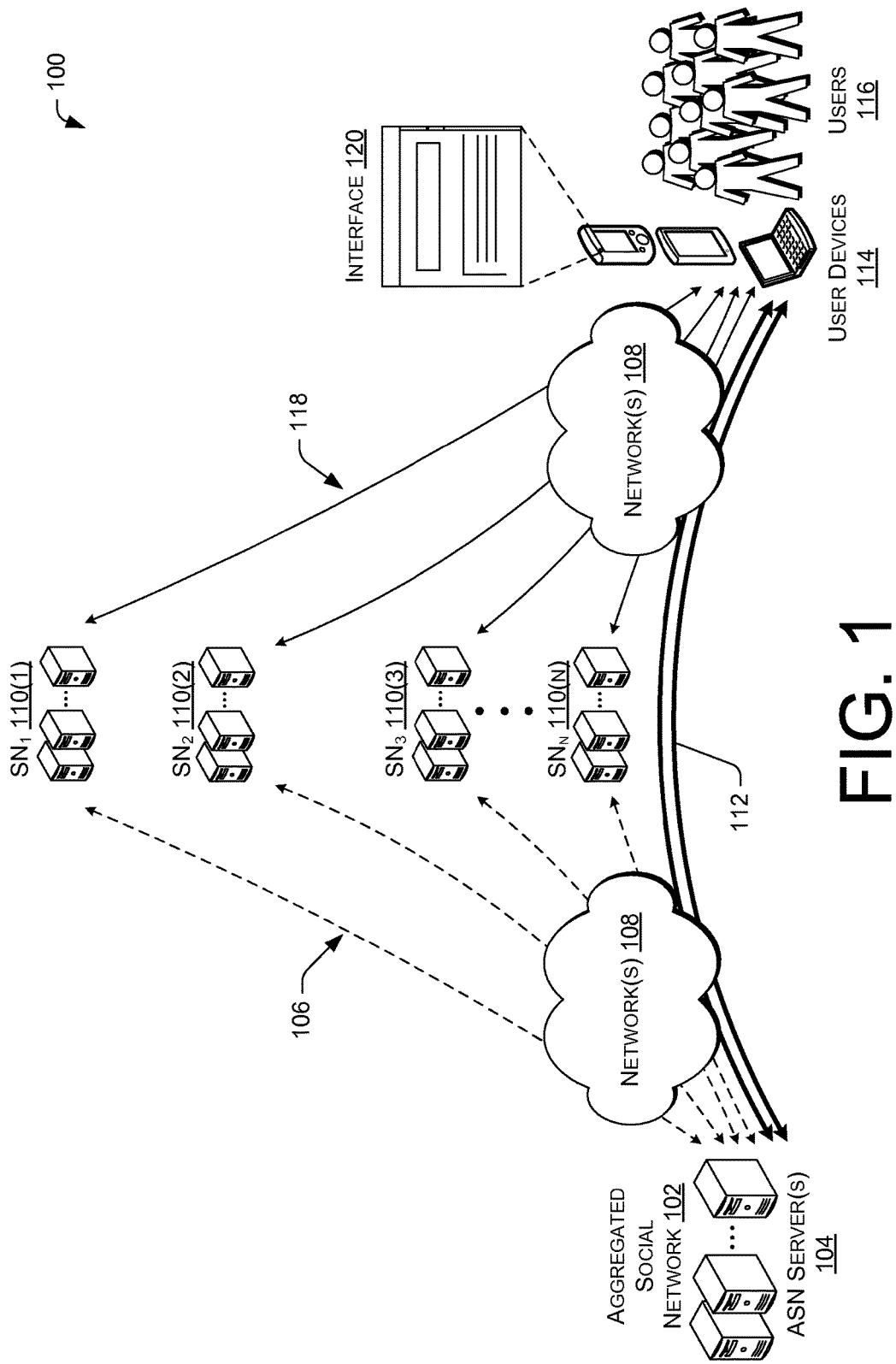
FIG. 1 is a schematic diagram of an illustrative computing environment usable to create and operate an aggregated social network through interaction with other social networks.

FIG. 1 is a schematic diagram of an illustrative computing environment 100 usable to create and operate an aggregated social network through interaction with other social networks. The environment includes an aggregated social network (ASN) 102 that may be hosted by one or more ASN servers 104. The ASN servers 104 may be in communication, via a first set of connections 106 by a network 108, with social networks (SNs) 110(1), 110(2), 110(3), . . . , 110(n), each hosted by respective servers or computing devices. The ASN servers 104 may also be in communication, via a second set of connections 112 via the network 108, with user devices 114 associated with users 116 that are members of one or more of the various social networks 110. The user devices 114, and thus the users 112, may be in communication, via a third set of connections 118 by the network 108, with the social networks 110.

The user devices 114 may include mobile telephones, smart phones, tablet computers, laptop computers, netbooks, personal digital assistants (PDAs), gaming devices, media players, or any other computing devices that can exchange information with the social networks 110 and/or the ASN 102 via the networks 108. The networks 108 may include one or more wired or wireless networks that provide connectivity between the electronic hardware shown in FIG. 1. The networks 108 may include local area networks (LANs), wide area networks (WANs), the internet, mobile telephone networks, Wi-Fi networks, and/or other types of networks.

The social networks 110 may include software to allow users to create, share, and manage information about the user and the user's network of friends, family, colleagues, classmates, and other acquaintances. The social networks 110 may enable users to create posts (e.g., status updates, blogs, etc.), send messages to other users (e.g., email, instant messaging, etc.), maintain and organize media (e.g., photographs, videos, lists of books, etc.), track events, receive and interact with advertising, and perform other tasks. However, some of the social networks 110 may only perform some of these tasks, such as broadcast messages to other users, send electronic mail to specific users, and so forth. The social networks 110 may also enable users to interact with third party software to perform other functionality. Current examples of social networks include Facebook®, Linkedin®, Google+®, and Twitter®.

The ASN 102 may operate as a social network and include some or all of the functionality described above for the social networks 110, and may also include functionality in addition to that described above. In addition, the ASN 102 may include data from the social networks 110, which may be accessible through links or may be extracted from the social networks 110. For example, the ASN 102 may extract profile information, posts, contacts, or other data from a user's account after the user provides the ASN 102 with the user's credentials and permission to access the user's account on behalf of the user. In some embodiments, the ASN 102 may create links to data from other ones of the social networks so that the data is updated when the respective social network is updated (e.g., updates to user's profiles, posts, message feeds, etc.).

In accordance with some embodiments, the ASN 102 may be a hub that allows a user to access some or all of the other social networks 110. For example, a user may link his other social network accounts in the ASN 102, and then interact with the ASN to stay up-to-date on activity in the other social networks. The ASN 102 may allow the user to communicate with other users via any of the social networks connected with the ASN 102. In some embodiments, the ASN 102 may interact with messaging mechanisms of the other social networks. Thus, a first user, Sally, may transmit a message from the ASN 102 to a second user, Andy, who may receive the message and view the message in one of the social networks 110, such as SN 110(1). The ASN 102 may use a messaging mechanism of the SN 110(1) to facilitate the communication. In addition, the ASN may perform other tasks, such as build a directory of contacts, create routing infrastructure for the other social networks to access data, create and maintain reputation score for users, and perform other tasks discussed herein.

The ASN 102 may be accessible to the users 116 via an interface 120 that may be displayed to the users on their respective user devices 114. The interface 120 may include frames, links, or other data from the other social networks, which is distributed to the user device through the ASN 102 by the ASN server(s) 104. The ASN 102 may be deployed through a website, as a dedicated application, or both.

Figure 2:
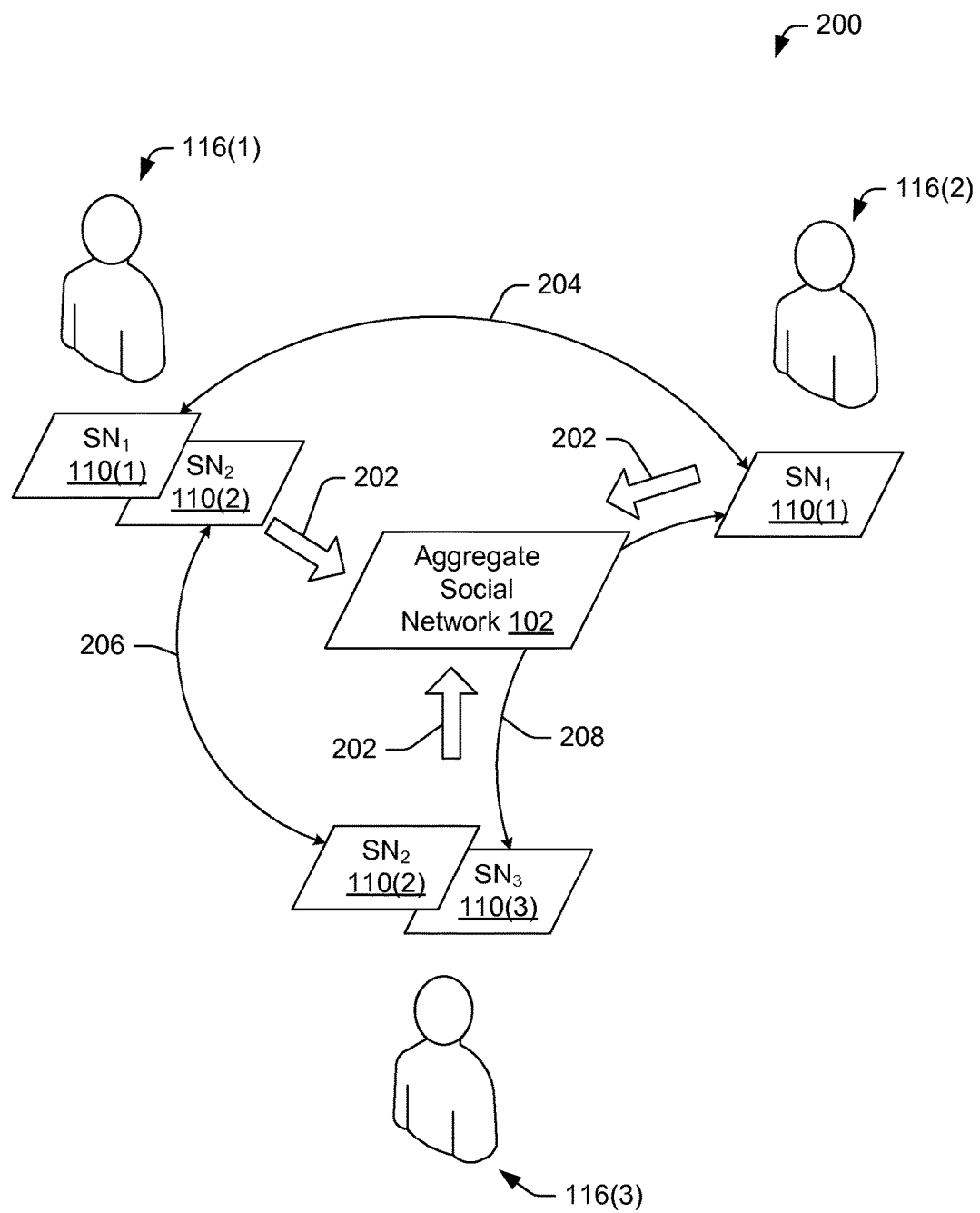
FIG. 2 is a schematic diagram of illustrative communications between users that interact with various social networks and an aggregated social network.

FIG. 2 is a schematic diagram of illustrative communication paths 200 between users that interact with various social networks and the ASN 102. The illustrative communication paths further illustrate how the ASN 102 may facilitate communications between the users 116.

As shown in FIG. 2, each of the users 116 may be members of (or have accounts with) one or more of the social networks 110. For example, a first user 116(1) may be a member of the SN 110(1) and the SN 110(2), a second user 116(2) may be a member of the SN 110(1), and a third user 116(3) may be a member of the SN 110(2) and the SN 110(3). The users 116 may also have accounts with the ASN 102. As discussed above, the ASN 102 may link or otherwise extract information, via paths 202, from the SNs 110 to obtain data from the various SNs to populate, in part, data in the ASN 102, including but not limited to directory data and routing data. The ASN 102 may be in communication with messaging mechanisms of the various social networks 110 to enable exchanging or otherwise extracting data from communications performed by the messaging mechanisms.

The users 116 may communicate with each other directly between a same one of the SNs 110, when possible, and/or through the ASN 102 as described below. For example, the first user 116(1) may send a message (post, instant message, email, etc.) to the second user 116(2) via a communication path 204. Since both users 116(1) and 116(2) are members of the SN 110(1), they may then communicate with each other through a messaging mechanism of that social network without reliance on the ASN 102. However, the communications may be extracted or linked by the ASN 102 via the paths 202 (e.g., application program interfaces (APIs), automated scripts, etc.). Thus, the user 116(2) may receive the message via logging into the SN 110(1) or by logging into the ASN 102 and then checking messages. Similarly, the first user 116(1) and the third user 116(3) may communicate via a communication path 206 between the SN 110(2).

However, the third user 116(3) may not communicate with the second user 116(2) without use of the ASN 102 since the third user 116(3) and the second user 116(2) do not share a same one of the SNs 110. The third user 116(3) may transmit a message using the ASN 102 to be delivered to the second user 116(2) via the SN 110(1). The second user 116(2) may then retrieve the message via the SN 110(1) or the ASN 102. Similarly, the second user 116(2) may transmit a message using the ASN 102 to be delivered to the third user 116(3) via the SN 110(2) or the SN 110(3). The third user 116(3) may then retrieve the message via the SN 110(2) or the 110(3) (possibly depending on the destination designated by the second user 116(2)) or the ASN 102. Of course, each of the users 116 may also communicate directly from within the ASN 102 and without using the individual SNs 110.

Illustrative Computing Architecture

Figure 3:
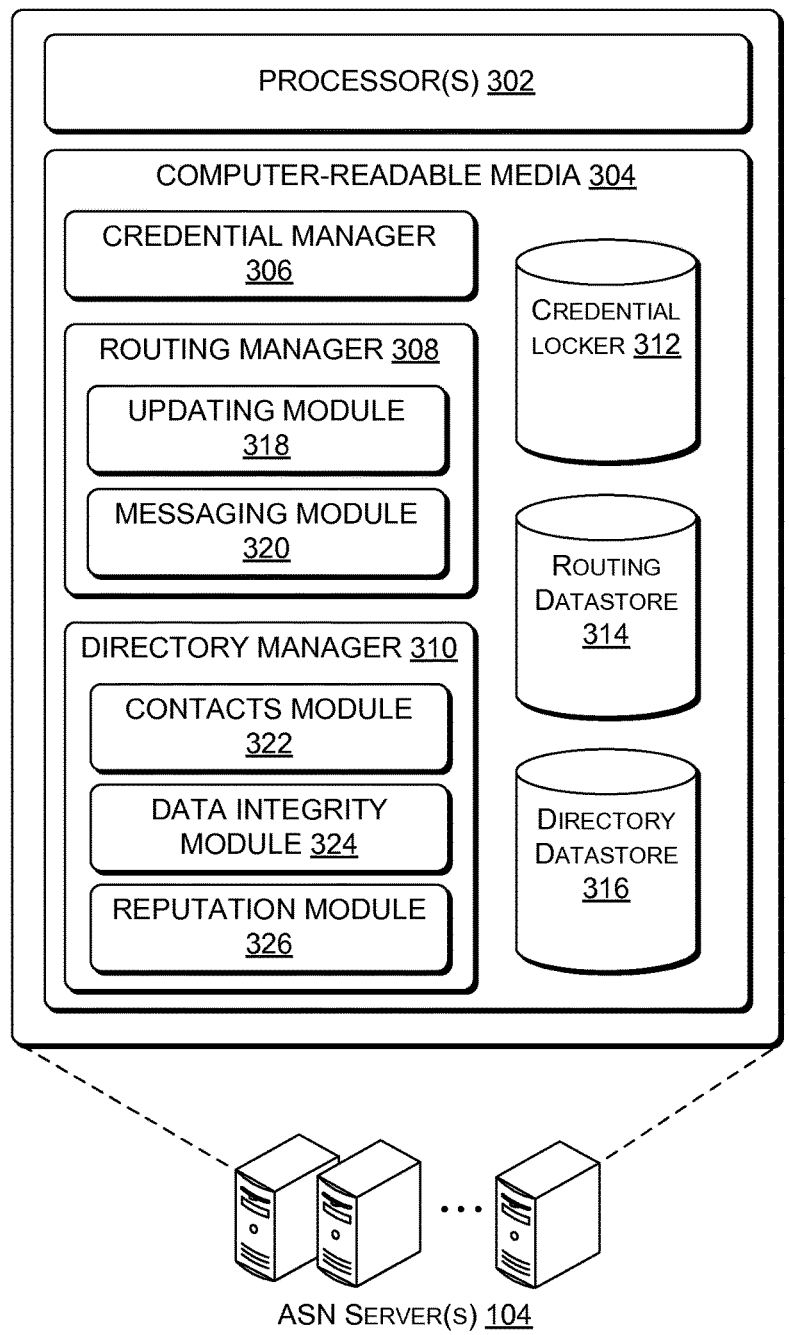
FIG. 3 is a block diagram of an illustrative computing device that may create and operate an aggregated social network.

FIG. 3 is a block diagram of an illustrative computing architecture 300 that may create and operate the ASN 102. The computing architecture 300 may be implemented in a distributed computing environment (e.g., cloud services, etc.) or non-distributed computing environment (e.g., a server farm, etc.), which is represented by the ASN servers 104.

The computing architecture 300 may include one or more processors 302 and one or more computer readable media 304 that stores various modules, applications, programs, or other data. The computer-readable media 304 may include instructions that, when executed by the one or more processors 302, cause the processors to perform the operations described herein for the ASN 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 304 may store a credential manager 306, a routing manager 308, and a directory manager 310. The credential manager 306 may store data in a credential locker 312. The routing manager 308 may store routing information (e.g., links, addresses, attributes, messages, etc.) in a routing datastore 314. The directory manager 310 may store directory information (contacts, cross references, etc.) in a directory datastore 316. Each of the managers is discussed in turn.

The credential manager 306 may receive user credentials for one or more of the SNs 110 to enable the ASN 102 to access a respective one of the SNs 110. The credential manager 306 may store the credentials along with an identifier for the corresponding SN 110 in the credential locker 312. The credential manager 306 may be used to access the SNs 110 using the credentials in the credential locker 312 at various times. For example, the credential manager 306 may use the credentials to access one or more SNs 110 in response to a user request, or at other times (with or without the user being logged in to the ASN 102), such as at predetermined intervals, random intervals, in response to events, and so forth. In some embodiments, the credentials may include at least one of a username, passcode, and/or an authentication token.

The routing manager 308 may extract or link data from the SN 110 once the SNs 110 are accessible by the credential manager 306. The routing module 308 may determine addresses, locations, or other routing information to access the information from the SNs 110. The routing manager 308 may include an updating module 318 and a messaging module 320, each described in turn.

The updating module 318 may analyze one or more of the SNs 110 and extract or link data from the SNs 110 to the ASN 102 when the data is not already linked or extracted. The updating module 318 may extract or link profile information (e.g., interests, background history, etc.), media (photos, videos, etc.), and so forth. The updating module 318 may include attribute mappings that map data between the SNs 110 and the ASN 102. For example, some of the SNs 110 may include information that is the same or similar but is included in different fields or locations, or is designated by different identifiers. For instance, one of the SNs 110 may include "favorites" while another SN may include "interests" and a third SN may include "likes", which may all identify items of interest to user. The ASN 102 may extract data from each of these designators in the respective SNs and link or store the data in a same or similar location in the ASN 102. In some embodiments, the ASN 102 may enable the user to modify data in the ASN 102, which may then cause the updating module 318 to make an update to an associated field (or item) in one or more of the SNs 110 using the routing information obtained by the routing manager 308. Thus, a user may manage and update one or more of the SNs 110 through input to the ASN 102 rather than having to update each of the SNs 110 individually. The updating module 318 may use an API, automated scripts, or other software instructions to update data on the SNs 110 after using the credentials to access the respective SNs.

The messaging module 320 may facilitate sending messages and/or extract or link messages. The messages may include posts, instant messages, blogs, status updates, emails, notifications, or other types of messages that are intended for specific users or broadcast to all users in one of the SNs. In some embodiments, the messaging module 320 may receive a message, a designated recipient (which may be inferred from the type of source), and a source. The messaging module 320 may transmit messages in the ASN 102 and also by accessing messaging mechanisms in the SNs 110 via the routing information in the routing datastore 314. The messaging module 320 may use an API, automated scripts, or other software instructions to interact with the messaging mechanisms of the other SNs 110. In an example, the first user 116 (1) may desire to send a message from the ASN 102 to the second user 116(2) at the SN 110(1). The messaging module 320 may receive the message from the first user 110(1) and then transmit the message to the second user 116(2) in the SN 110(1) using a corresponding messaging mechanism of the SN 110(1). The messaging mechanism may be a mechanism to create posts, instant messages, blogs, status updates, emails, notifications, or other types of messages. The messaging module 320 may also extract or link messages that are communicated between users with one the SNs 110 and that doesn't originate at the ASN 102. For example, when the first user 116(1) transmits a message to the second user 116(2) via the SN 110(1), the messaging module 320 may extract or link the message from accounts of the users (one or both) to enable display or retrieval of the message using the ASN 102.

The directory manager 310 may create and maintain a directory of contacts for users of the ASN 102. The directory manager 310 may link or extract contact information from the SNs 110 once the SNs are accessible by the credential manager 306. The directory manager 310 may include a contacts module 322, a data integrity module 324, and a reputation module 326, each described in turn.

The contacts module 322 may extract or link a user's contacts from each of the user's SNs, which may be used to populate the directory datastore. The contacts module 322 may use an API, automated scripts, or other software instructions to access the contacts of the other SNs 110. The contacts module 322 may associate the origin of the relationship for each contact. For example, when the first user 116(1) is a member of the SN 110(1) and the SN 110(2), the contacts module may associate the user's contacts with one of these SNs. That data may later be used to create default information, such as a default destination for messaging via the messaging module 320, and so forth. The contacts module 322 may also provide recommendations to the user. The recommendations may include recommending possible contacts based on data compiled in the directory datastore 316 (e.g., you may also know . . . ) and recommending the user to connect with contacts in other SNs where connections do not exist (e.g., friend x may be connected in SN 110(1) but not in SN 110(2)).

The data integrity module 324 may validate the contacts, merge contacts, or otherwise perform data integrity operations to the contacts to maintain and optimize the directory information in the directory datastore 316. In some embodiments, the data integrity module 324 may merge contacts or otherwise associate contacts that are the same for a user, but associated in different ones of the SNs 110. For example, the first user 116(1) may have a contact "Joe Adams" in the SN 110(1) and a contact "Joseph Adams" in the SN 110(2), which may in fact be the same person. The data integrity module 324 may merge the contacts, either with or without input from the first user 116(1). For example, if a threshold amount of information is similar between the accounts associated with "Joe Adams" and "Joseph Adams", then the data integrity module 324 may recommend the merger or may perform the merger without user input. The user may also initiate the merger using the data integrity module 324.

In various embodiments, the data integrity module 324 may also analyze contacts to determine whether false positive relationships or fraudulent contacts exist in a user's account. For example, the first user 116(1) may have a contact "Andy Smith" in the SN 110(1) and a contact "Andy Smith" in the SN 110(2). Through analysis, the data integrity module 324 may determine that the two instances of "Andy Smith" do not appear to be the same person based on a comparison of attributes of the contacts, which may include comparison against a threshold amount of attributes (e.g., deviations in the attributes, etc.), or by analysis of other data (relationships of the contact, etc.) and so forth. The data integrity module 324 may trust data from some sources based on data validations provided by the sources. For example, sources that verify the identity of contacts using financial transactions may be provided a greater level of trust or strength than contacts maintained by sources that rely on verification by electronic mail addresses.

The reputation module 326 may generate a reputation score for a user based on various factors and/or data associated with the user. The reputation score may be based at least partly on one or more of an amount of activity of a user, a number of contacts of a user, a number of memberships and type of memberships in the SNs 110 by the user, the SNs 110 that the user is a member of, interests of the user, a type of validation of the user's identity, transaction history of the user, and/or other attributes captured by the ASN 102 via the various modules described above. The reputation module 326 may use the reputation score for various types of activities, such as to unlock or grant special permissions for the user, for advertising, for recommendations, or for other types of uses. The reputation score may be published by the ASN 102 to selected parties (e.g., based on user consent, etc.), such as the user, designated users or entities, and/or other users or entities. The reputation score may be stored in the directory datastore 316.

Illustrative Operation

FIGS. 4-7 are illustrative processes to perform operations associated with the aggregated social network. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
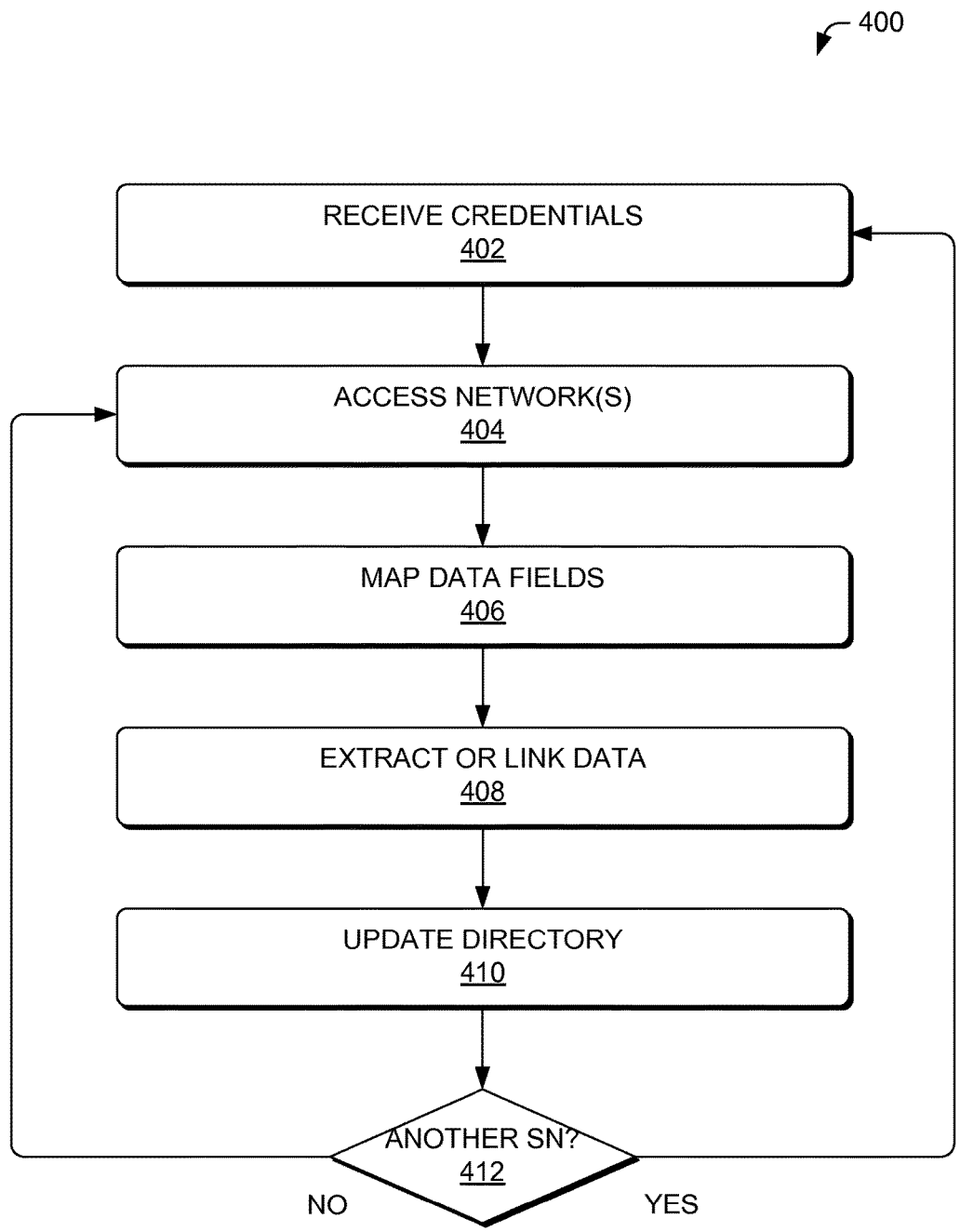
FIG. 4 is a flow diagram of an illustrative process to create routing information in the aggregated social network from data associated with a social network.

FIG. 4 is a flow diagram of an illustrative process 400 to create routing information in the ASN 102 from data associated with one or more of the SNs 110. The process 400 is described with reference to the environment 100 and may be performed, at least partly, by the credential manager 306, the routing manager 308, and/or the directory manager 310 of the ASN 102. Of course, the process 400 may be performed in other similar and/or different environments.

At 402, the credential manager 306 may receive credentials for a user for a specific one of the SNs 110. The credentials may include a log in identifier (ID), a passcode, and/or other data. In some embodiments, the ASN 102 may use an authorization token to access and interact with the specific one of the SNs 110 as the credential. For example, the SN may generate, after user approval, a token for the ASN 102 to access the user's account. The token may be encrypted and provide a high level of security. The token may also be valid even after a user changes his/her log in ID or passcode or until the token is canceled or revoked by the user or the SN.

At 404, the routing manager 308 may access the SN using the credentials (e.g., username, password, token, etc.) obtained at the operation 402. The routing manager 308 may access the SN by logging in to the SN on behalf of the user, using an API to interact with the SN, using automated scripts, etc.

At 406, the routing manager 308, via the updating module 318, may map data fields in the SN to data fields in the ASN 102. For example, the updating module 318 may determine that a field (or item, etc.) that is listed as a "favorite" in the SN may be mapped to the ASN 102 in a field listed as an "interest". In some instances, the updating manager 318 may create new fields in the ASN 102 to accommodate data from the SN, such as when the SN creates new data fields that are not associated with pre-existing data fields in the ASN 102.

At 408, the routing manager 308, via the updating module 318, may extract or link data from the SN 110 to the ASN 102 using the mapped fields (or items). For example, the updating module 318 may extract profile information, extract media, or extract other information. In some instances, the updating module 318 may create links to data from the SN, such that the data may be available in the ASN 102 via the link directed to the source data in the SN. To access the data via the link, the ASN may transmit a request and the credentials to enable access to the data without further user input by a requesting user.

At 410, the directory manager 310 may update the directory based on contacts associated with the user in the SN. The update to the directory is discussed in further detail with reference to FIG. 5 below.

At 412, the routing manager 308 may determine whether another SN is associated with a user. When no other SN is associated, the process 500 may continue at the operation 404 (following the "no" route from the decision operation 412) to continue to update data from the SN. For example, updates may occur at predetermined intervals, in response to predetermined events, in response to a user action, and so forth. When another SN is associated with a user (e.g., available for connection by the ASN 102), then the process 500 may continue at the operation 402 following the "yes" route from the decision operation 412. Thus the process 400 may continue to update information in the ASN 102 when new accounts are assessable by the ASN 102, such as via when the credentials manager 306 receives credentials from a new user or from a new SN of an existing user.

Figure 5:
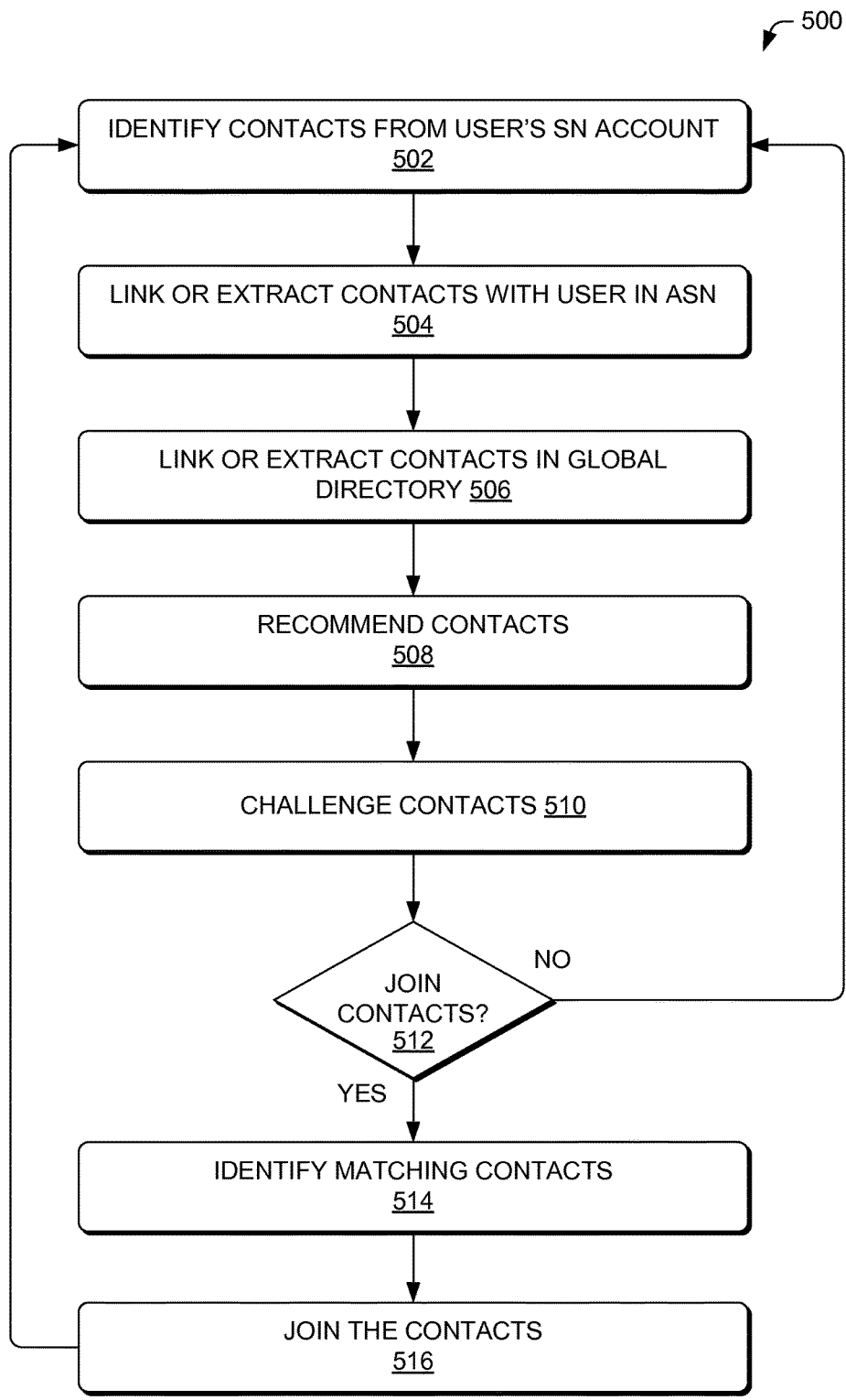
FIG. 5 is a flow diagram of an illustrative process to manage a directory of contacts in the aggregated social network.

FIG. 5 is a flow diagram of an illustrative process 500 to manage a directory of contacts in the aggregated social network. The process 500 is described with reference to the environment 100 and may be performed, at least partly, by the directory manager 310 of the ASN 102. Of course, the process 500 may be performed in other similar and/or different environments. The operations described in the process 500 may be performed in the context of the operation 410 in the process 400, such as after receiving the credentials from the user at 402, etc.

At 502, the directory manager 310 may identify contacts from the user's SN account. For example the directory manager 310 may access a list of the user's contacts (e.g., friends, associates, relative, classmates, etc.) through an API and/or through logging into the SN using the credentials. The directory manager 310 may use information from the routing manager 308 to identify or location the contacts in each of the SNs 110.

At 504, the directory manager 310 may link or extract the contacts to the user's account in the ASN 102. For example, the directory manager 310 may add the contacts to the directory datastore 316 and associate the contacts with the user's account in the ASN 102. Thus, the user may have access to the contacts (and possibly other information about the contacts such as messaging addresses, attributes, associate SN, and other data) through the directory extracted or linked by the directory manager 310 to the ASN 102.

At 506, the directory manager 310 may link or extract the contacts to a global directory in the ASN 102. The global directory may expand relationships from in the user's account with relationships from other user's account to create a master or global directory. The global directory may be used to perform many tasks, such as create recommendations for users, detect false positives or fraudulent accounts, and so forth. For example the directory manager may perform cross-relationship analysis on the contacts to determine whether the contacts are valid (e.g., not fraudulent or false positives), analyze attributes of the contacts to determine whether the contacts are valid, and so forth. The analysis may be use threshold values to classify the contacts as valid, invalid, fraudulent, etc.

At 508, the directory manager 310 may recommend contacts to the user based on the data in the directory datastore 316 (via the operations 504 and 506). For example the recommendation may be add a contact to the ASN 102 or another SN that the user is not currently associated with, but may be closely associated via an existing contact. The recommendation may also include a recommendation to connect with a current contact using a different SN that does not include the contact (e.g., friends with "Sally" in SN 110(1), but not in SN 110(2), etc.).

At 510, the directory manager 310 may challenge contacts that may be false positives, fraudulent contacts, or otherwise trigger a challenge by the directory manager 310. The directory manager 310 may create the challenge based on an analysis of the contact in view of the global directory created via the operation 506. For example, when the directory manager 310 determines that a contact of the user has more than a threshold amount of attributes that are not similar to another instance of the contact (e.g., from another network and associated with the user), then the directory manager 310 may initiate a challenge. The directory manager 310 may also initiate the challenge when the contact has no other close relation to the user based on a closeness mapping in the directory datastore 316 (e.g., user knows contact A through contact B, etc.), also known as degrees of separation. The directory manager 310 may conduct the challenge by providing a notification to the user, removing the contact, or performing other appropriate actions.

At 512, the directory manager 310 may determine whether to join contacts. When contacts are to be joined (following the "yes" route), then the process 500 may advance to the operation 514. At 514, the directory manager 310 may identify matching contacts. The identification may be performed by comparing attributes of the contacts from different ones of the SNs 100 to a similarity threshold. At 516, contacts that reach or exceed the threshold from the identification operation 514 may be joined (associated as the same person). The joining may include user input, such as a user authorization, or may be performed automatically, such as based on the amount of matching attributes or a confidence level of the match that is determined by the directory manager 310. The joining may factor in data from the operation 510.

When contacts are not to be joined (following the "no" route), or following the operation 516, the process 500 may advance to the operation 502. Thus, the process 500 may continue to update the directory by accessing the SN or other SNs 110 for the user or other of the users 116 to create and maintain the directory datastore 316.

Figure 6A:
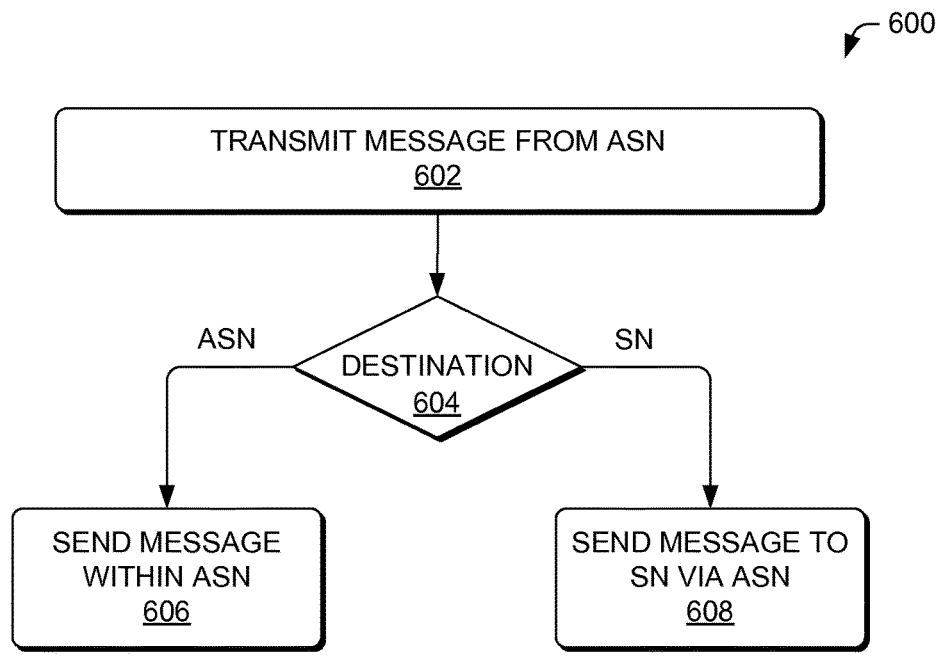
FIGS. 6A and 6B are flow diagrams of illustrative processes to transmit a message through a social network or the aggregated network for distribution to another user via the social network, the aggregated network, or another social network.
Figure 6B:
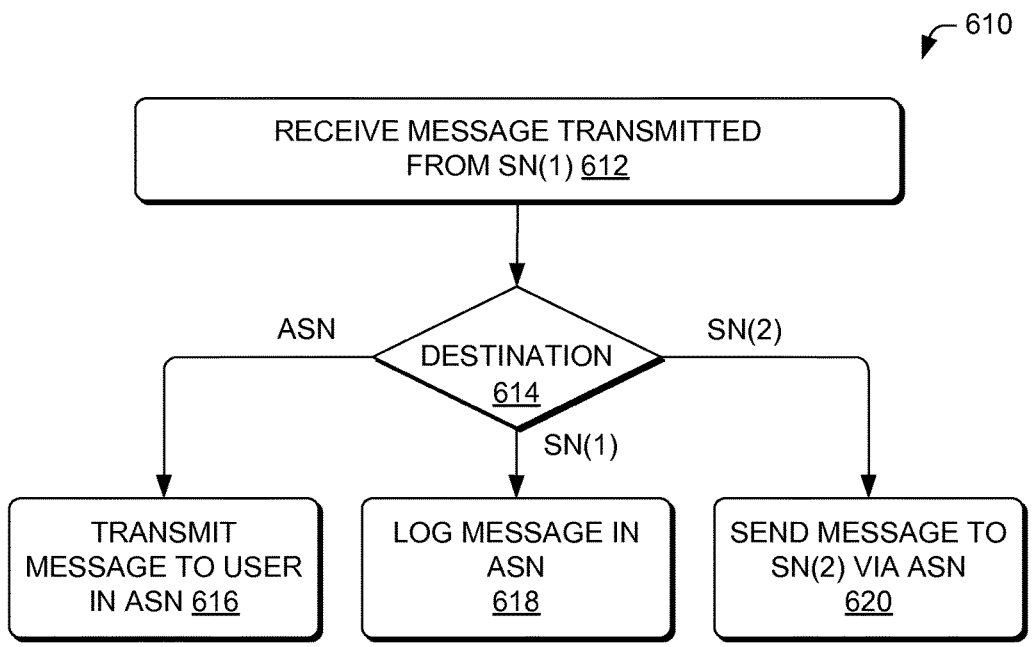

FIGS. 6A and 6B are flow diagrams of illustrative processes to transmit a message through a social network or the aggregated network for distribution to another user via the social network, the aggregated network, or another social network.

FIG. 6A shows a process 600 that includes a message that originates from the ASN 102. The process 600 is described with reference to the environment 100 and may be performed, at least partly, by the messaging module 320 of the routing manager 308 of the ASN 102. Of course, the process 600 may be performed in other similar and/or different environments.

At 602, the messaging module 320 may receive a message generated within the ASN 102 that is to be transmitted from one user to another user. The message may be generated by the ASN 102, such as via a message generating mechanism in the ASN 102 that enables a user to create the message (e.g., a post, an instant message, a status update, an electronic mail, etc.).

At 604, the messaging module 320 may determine the destination of the message. When the message is determined to be transmitted to a recipient within the ASN (following the "ASN" route), then the process 600 proceeds with the operation 606.

At 606, the messaging module 320 may transmit the message to the recipient in the ASN 102. Thus, the message may be transmitted internally via the ASN without interaction with any of the SNs 110.

When the message is determined to be transmitted to a recipient at one of the SNs 110 (following the "SN" route), then the process 600 proceeds with the operation 608. At 608, the messaging module 320 may send the message to the SN using a messaging mechanism of the SN. For example, the ASN 102 may transmit the messaging using the SN message mechanism by accessing the SN message mechanism through an API, by logging into the user's account with the SN, etc. In this way, the ASN 102 transmits the message to the user by leveraging the message mechanism used by the SN through use of the API.

FIG. 6B shows a process 610 that processes a message that originates from an SN(1). For example, the ASN 102 may intercept the message using the messaging module 320, and then perform further processing. The process 610 is described with reference to the environment 100 and may be performed, at least partly, by the messaging module 320 of the routing manager 308 of the ASN 102. Of course, the process 610 may be performed in other similar and/or different environments.

At 612, the messaging module 320 may intercept or otherwise receive a message that originates from an SN(1), and is thereby received by the ASN 102. For example, the messaging module 320 may receive (or intercept) the message using an API that allows users of the SN(1) to transmit messages to the ASN and/or to other SNs (e.g., SN(2)), via the ASN 102.

At 614, the messaging module 320 may determine the destination of the message. When the message is determined to be transmitted to a recipient within the ASN (following the "ASN" route), then the process 610 proceeds with the operation 616.

At 616, the messaging module 320 may transmit the message to the recipient in the ASN 102. For example, the ASN 102 may receive the message from the SN and then direct or route the message to the user in the ASN 102. Thus, at 616, a user may transmit a message from an SN to a contact for receipt by the contact (recipient) in the ASN 102. As discussed above, the messaging module 320 may use an API, automated scripts, or other software instructions to interact with the messaging mechanisms of the other SNs 110.

When the message is determined to be transmitted to a recipient within the same SN (following the "SN(1)" route), then the process 610 proceeds with the operation 618. At 618, the messaging module 320 may log the message in the ASN 102. For example, the messaging module 320 may link or extract the message for access in the ASN 102; however, the distribution of the message may be performed by the respective SN via an associated messaging mechanism. For example, the operation 618 may occur when messaging follows the communication paths 204 or 206 as shown and described with reference to FIG. 2. The logging may indicate to a user that the message exists, but may or may not include the substance of the message unlike the operation 616.

When the message is determined to be transmitted to a recipient in a different SN (following the "SN(2)" route), then the process 610 proceeds with the operation 620. At 620, the messaging module performs a two step process. First, the messaging module 320 receives the message and identifies the destination of the message. Second, the messaging module 320 transmit the message to the SN(2) (the destination SN) using similar techniques as discussed above with reference to the operation 608. The messaging module 320 my use a first API to interface with the SN(1) and retrieve the message and identify the recipient (which may be provided by the ASN 102). The messaging module 320 may use a second API to interface with the SN(2) to transmit the message to the identified recipient.

Figure 7:
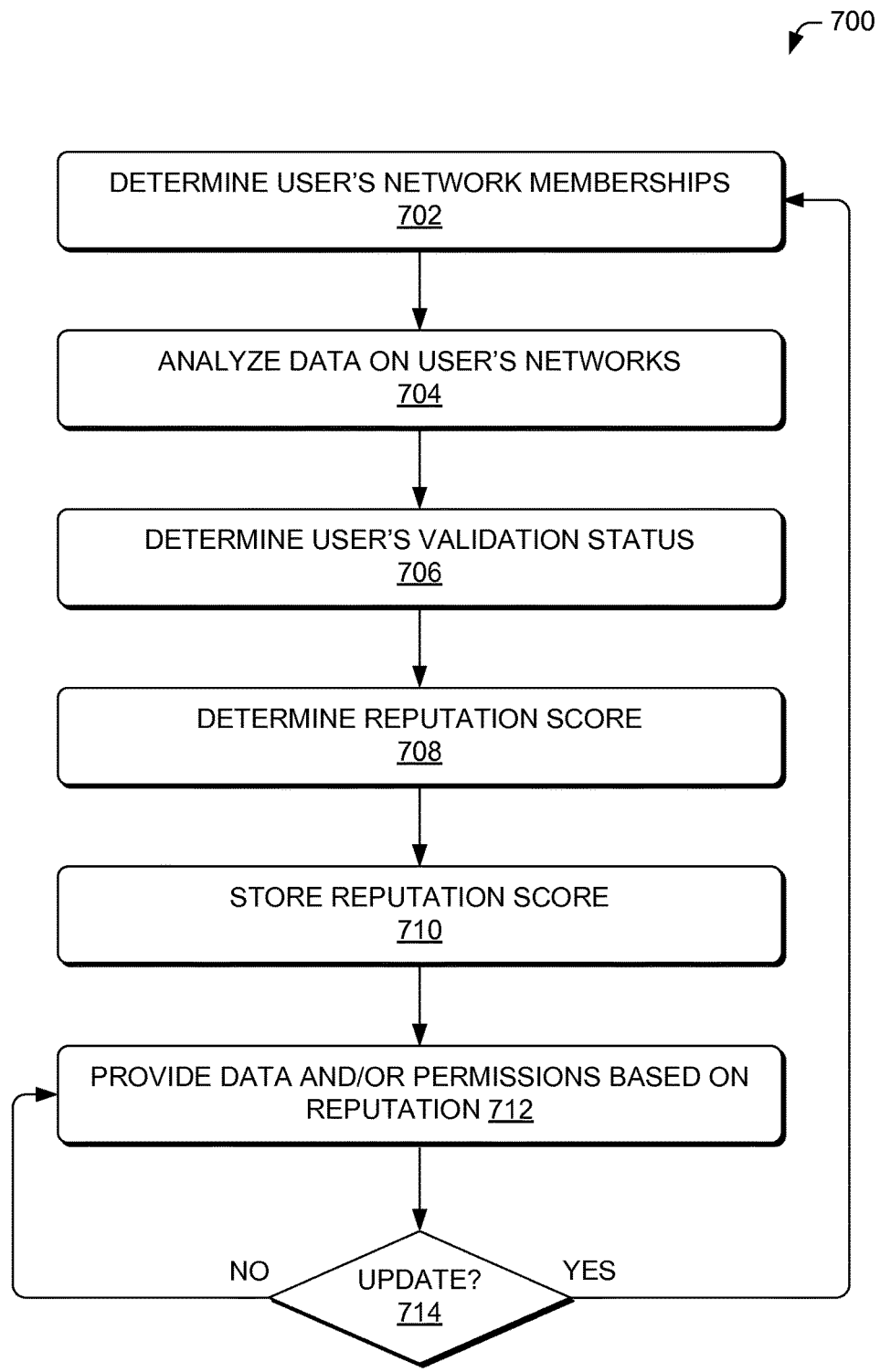
FIG. 7 is a flow diagram of an illustrative process to determine a reputation score for users in the aggregated social network.

FIG. 7 is a flow diagram of an illustrative process 700 to determine a reputation score for users in the aggregated social network. The process 700 is described with reference to the environment 100 and may be performed, at least partly, by the reputation manager 326 of the directory manager 310 of the ASN 102. Of course, the process 700 may be performed in other similar and/or different environments.

At 702, the reputation module 326 may determine a user's network memberships. For example, the reputation module 326 may determine which of the SNs 110 the user holds accounts in or otherwise uses, such as by analyzing the data in the credential locker 312 for the user. The reputation module 326 may also determine the type of membership of the user in these accounts, if applicable. For example some SNs may include levels such as "free," "paid," "professional," etc.

At 704, the reputation module 326 may analyze data on the user's networks. For example, the user may determine an amount of activity in the user's accounts, an amount of data about the user (e.g., user's profile, amount of messages, etc.), a size or number of the user's contacts, or other information indicative of user involvement, time spent on the various SNs, and so forth.

At 706, the reputation module 326 may determine a users' validation status. The validation status may be based on the user's providing of information to prove the user's identity. The validation status may be based on an email address, a mobile telephone number, a bank account or other financial information, and so forth, which allow the user to receive information from a network and prove identity via the source (email, telephone number, etc.).

At 708, the reputation module 326 may determine a reputation score (or level). The reputations score may be based at least in part on the data obtained in the operations 702-706. The reputation score may apply different weights to information or attributes when calculating or deriving the reputation score. For example, the number of messages received by a user may have a large impact (influence) on the user's reputation score than another factor, such as the number of photographs stored by the user, etc.

At 710, the reputation module 326 may store the reputation score in the directory datastore. The reputation score may be stored as a number, letter, name, or other designation which has some predefined significance. For example, the reputation score may be converted from a number derived by a formula (e.g., used in the operation 708) to a name, such as "new user," "expert user," or other type of name or classification.

At 712, the reputation module 326 may provide data and/or permissions to the user based on the reputation determined at the operation 708 and stored at the operation 710. In some embodiments, the reputation module 326 may provide data to the user based on the reputation. The data may be recommendations, advertisements, and/or other data. For example, the ASN 102 may limit (or possibly increase) advertising to users with a higher reputation score or status. In various embodiments, the reputation manager 326 may publish the reputation score to the user and/or to other users or entities (with the user's permission). For example, the reputation manager 326 may disclose a user's reputation score to potential advertisers. In accordance with one or more embodiments, the reputation manager 326 may provide special permissions or privileges to users based on the reputation score, such as decreased advertising, increased functionality (e.g., extra storage space for media, etc.), special display options, and so forth. For example, a user that achieves a threshold reputation score (or level) may be allowed to transmit messages directly to an SN via the ASN, which may be a feature not permitted or accessible to some users that do not have the threshold permission score. In some embodiments, the reputation score may influence a fee the user has to pay to access the ASN 102 or other features of provided by the ASN.

At 714, the reputation manager 326 may update the reputation score (or level) by returning to the operation 702 or another operation in the process 700. Between updates, the process 700 may continue to loop back to the operation 712 and provide the data and/or permissions based on the current reputation of a user. The reputation may be recalculated in response to an event (e.g., user interaction, etc.), periodically, randomly, on based on other factors.

Illustrative User Interface

Figure 8:
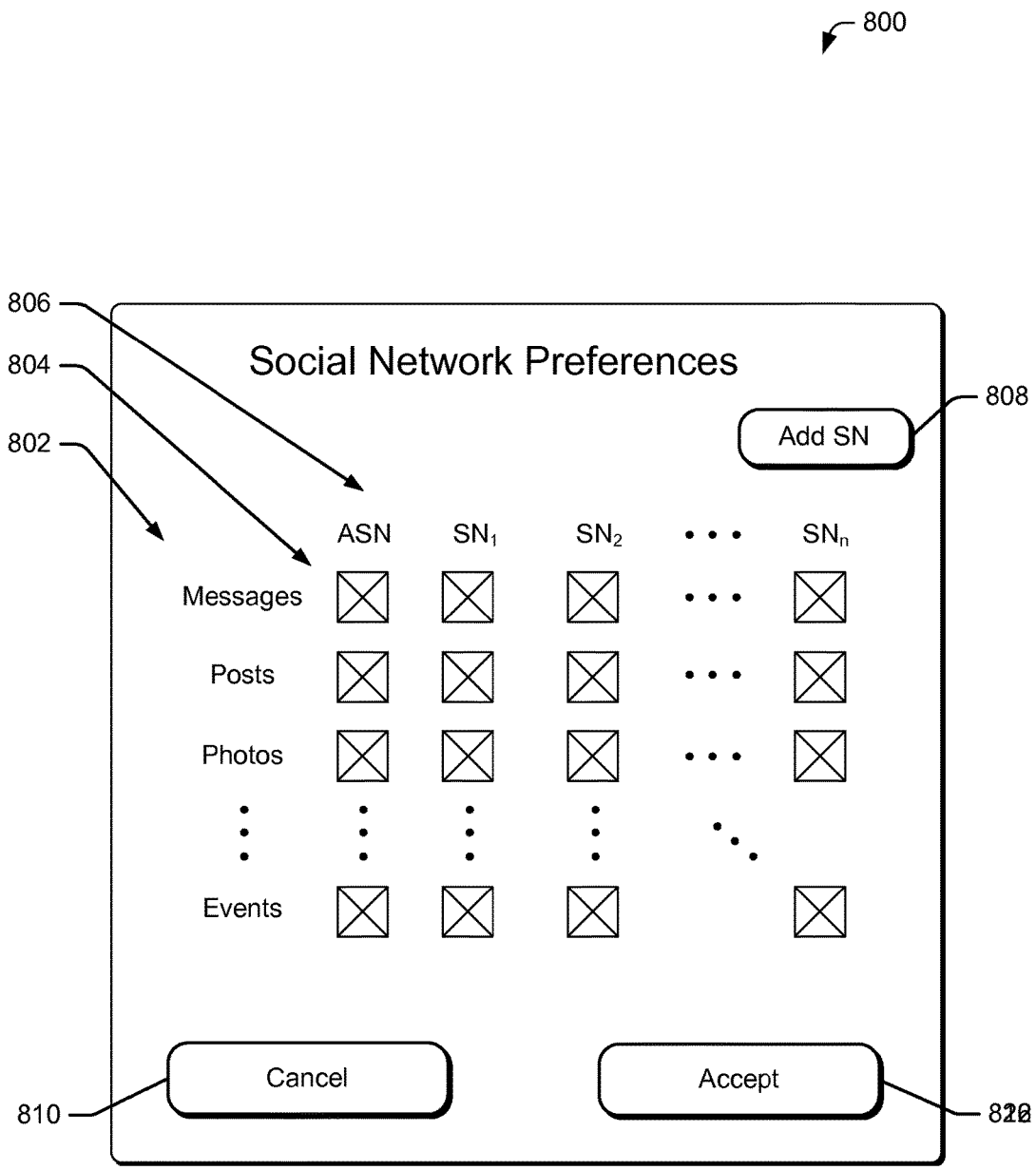
FIG. 8 is an illustrative user interface (UI) that enables a user to select preferences for various operations performed by the aggregated social network.

FIG. 8 is an illustrative user interface (UI) 800 that enables a user to select preferences for various operations performed by the aggregated social network. The UI 800 is illustrative of one of many types of interfaces that may enable a user to select account preferences or other types of preference to control operation of an account and/or operation of the ASN 102.

The UI 800 may enable the user to designate transmission preferences for various types of transmissions 802. The transmissions types 802 may include, for example, messages (e.g., emails, instant messages, etc.), posts (e.g., status updates, message boards, etc.), photos, videos, events, and so forth. Each of the transmissions types 802 may include a selector 804 associated with a destination social network 806 (e.g., the ASN 102, the SN 110(1), etc.). The user may activate the selector 804 when the user desires to have messages (or other transmission types) sent to one of the destination social networks 806. An "add SN" command 808 may enable a user to add a new social network, such as by providing credentials to the social network and possibly providing other data such as a location of the social network (e.g., universal resource locator (URL), etc.). The UI 800 may also include a cancel command 810 and an accept command 812 to accept changes made by the user in the UI 800.

Illustrative Applications

Figure 9:
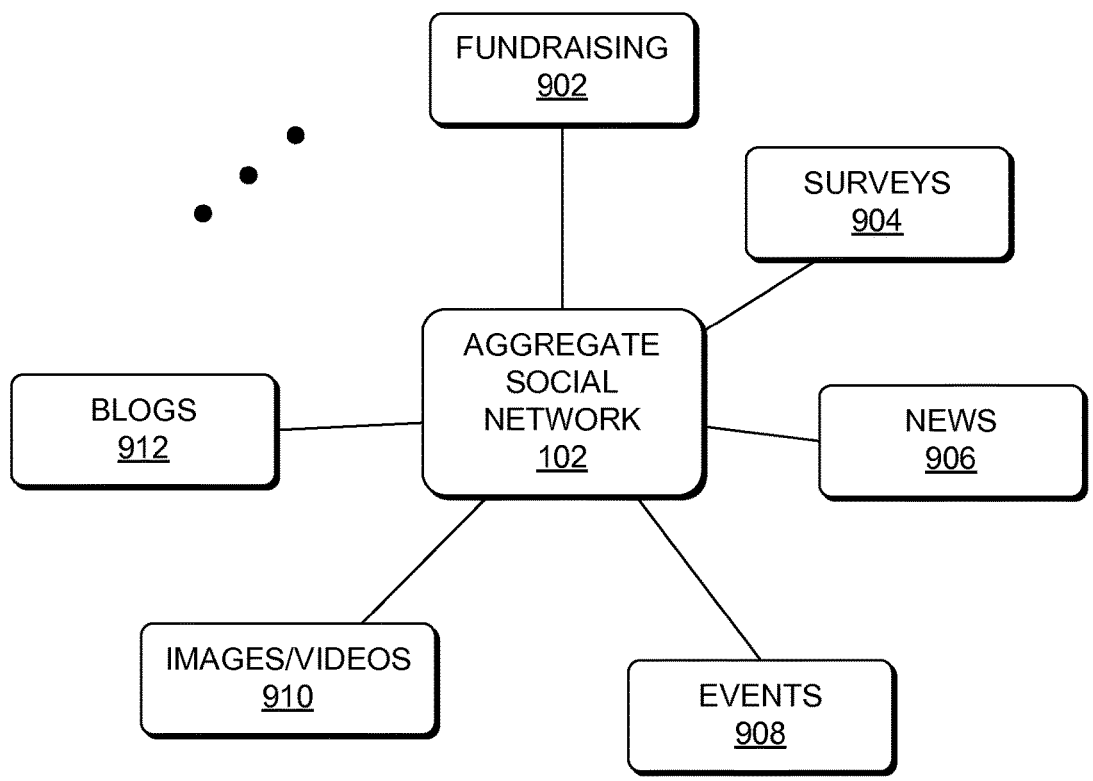
FIG. 9 is a schematic diagram that shows an illustrative cluster of various illustrative applications of the aggregated social network.

FIG. 9 is a schematic diagram that shows an illustrative cluster 900 of various illustrative applications of the aggregated social network. The cluster 900 is illustrative of some possible applications or uses of the ASN 102, but is not an exhaustive listing. For example, the ASN 102 may be used for many different purposes. Some sample applications are briefly discussed below.

In some embodiments, the ASN 102 may provide a fundraising application 902 to enable users to collect donations, seek funding, or otherwise engage in fundraising using the ASN 102 to connect to users in the SNs 110. For example, a user may generate messages, posts, a campaign, and/or other items using the ASN 102 (or possibly another one of the SNs 110, and then transmit the items to users through the ASN 102 as described above. By using the ASN 102, the user may reach a larger amount of contacts across the SNs 110 without having to recreate the same content in each of the SNs, combine responses, and perform other repetitive tasks. Similarly, the ASN 102 may include a survey application 904 to enable users to respond to questions in surveys using the ASN 102 connect to users in the various SNs 110.

In various embodiments, the ASN 102 may provide a news application 906 that allows users to stay abreast of news. The news may include commercial news from major network providers (e.g., the Associated Press®, etc.), news from friends (e.g., posts, status updates, etc.), local news (e.g., school updates, etc.), and so forth. The news application may provide message feeds from the various SNs 110 and/or other locations. By providing the news application, the user may not need to visit multiple ones of the SNs 110 to stay abreast of the news and current happenings. Similarly, the ASN 102 may include an events application 908 to enable users to track events, schedule events, maintain and interact with a calendar, etc using the ASN 102 connect with events maintained in the SNs 110.

In accordance with one or more embodiments, the ASN 102 may provide an image/video application 910 that aggregates images, videos, and/or other media from the SNs 110. This may enable a user to access, maintain, and add media from a single location, via the ASN 102, without having to upload and manage media in each of the SNs 110. Similarly, the ASN 102 may include a blogs application 912 to enable users to create messages, postings, etc. using the ASN 102 without having to separately create or post the information in each of the SNs.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
under control of one or more servers configured with executable instructions,
receiving credentials that provide access to a plurality of social network accounts, individual social network accounts of the plurality of social network accounts corresponding to an individual social network of a plurality of social networks;
hosting an aggregated social network, the aggregated social network including a communication link associated with data in the plurality of social network accounts and configured to transmit information between the aggregated social network and the plurality of social network accounts;
accessing the data of the plurality of social network accounts via the communication link and using the credentials;
identifying contacts of a user in the data of the plurality of social network accounts;
populating a directory of contacts in the aggregated social network, the directory of contacts to include relationships across the plurality of social networks;
presenting an aggregated social network user interface configured to provide access to content of the aggregated social network via the communication link, the content including at least one of the plurality of social network accounts;
receiving, by the aggregated social network user interface and via the communication link, a composed message and an intended recipient,
the composed message composed by the user, and
the intended recipient having connections with the user on at least two social networks of the plurality of social networks;
receiving a selection of a particular social network being one of the at least two social networks on which the user and the intended recipient are connected;
transmitting the composed message to the intended recipient using a messaging mechanism of the particular social network and via the communication link to produce a transmitted message;

creating a message link to data associated with the transmitted message; and storing the message link in the aggregated social network for display via the aggregated social network user interface to at least one of the user or the intended recipient.

2. The method as recited in claim 1, further comprising determining a reputation score for the user based at least in part on an amount of activity by the user in the plurality of social networks or in the aggregated social network.

3. The method as recited in claim 2, further comprising determining at least one of a privilege for the user associated with use of the aggregated social network based at least in part on the reputation score or an advertisement value of the user based at least in part on the reputation score.

4. The method as recited in claim 1, further comprising storing the credentials in a key locker, the credentials being at least one of usernames and passcodes, or authentication tokens associated with the plurality of social network accounts.

5. A method comprising:

receiving credentials that provide access to a plurality of social network accounts, individual social network accounts of the plurality of social network accounts corresponding to an individual social network of a plurality of social networks;

hosting an aggregated social network, the aggregated social network including a communication link associated with data in the plurality of social network accounts and configured to transmit information between the aggregated social network and the plurality of social network accounts;

accessing the data in the plurality of social network accounts via the communication link and using the credentials;

populating a directory of contacts of a user in the aggregated social network, the directory of contacts including contacts of the user in the aggregated social network and contacts identified via the communication link and included in the data;

presenting an aggregated social network user interface that is configured to provide access to the aggregated social network, including the directory of contacts and at least one of the plurality of social network accounts, via the communication link;

receiving, by the aggregated social network user interface and via the communication link, a composed message from the user and an intended recipient;

transmitting the composed message to the intended recipient using a messaging mechanism of a particular social network of the plurality of social networks and via the communication link to produce a transmitted message;

creating a message link to data associated with the transmitted message; and storing the message link in the aggregated social network for display via the aggregated social network user interface to at least one of the user or the intended recipient.

6. The method as recited in claim 5, further comprising transmitting a second message from the aggregated social network user interface to one of the plurality of social networks associated with a contact of the directory of contacts using a messaging mechanism of a first social network of the plurality of social networks.

7. The method as recited in claim 6, further comprising transmitting a third message from the aggregated social network user interface to one of the plurality of social networks associated with a contact of the directory of contacts using a messaging mechanism of a second social network of the plurality of social networks, the third message being different from the first message and the second message.

8. The method as recited in claim 5, further comprising:

extracting data from the composed message via the communication link of the aggregated social network; and providing the intended recipient access to the data from the composed message via the aggregated social network.

9. The method as recited in claim 5, further comprising determining a reputation score for the user of the aggregated social network based at least in part on one of:

a number of contacts in the aggregated social network, or an amount of activity by the user in plurality of social networks or the aggregated social network.

10. The method as recited in claim 9, further comprising at least one of providing the user with a privilege in the aggregated social network based on the reputation score of the user or determining an advertisement value of the user based at least in part on the reputation score of the user.

11. The method as recited in claim 5, further comprising performing a validation process on the directory of contacts to identify at least one of false positive contacts or fraudulent profiles of contacts.

12. The method as recited in claim 5, wherein the plurality of social networks are accessed using an application program interface (API).

13. The method as recited in claim 5, wherein accessing the data in the plurality of social network accounts is performed by at least one of extracting the data from the plurality of social networks and adding the data to the aggregated social network, or linking the data from the plurality of social networks to the aggregated social network.

14. The method as recited in claim 5, further comprising determining a recommended contact to recommend to the user based on the directory of contacts in the aggregated social network, the recommended contact being identified using relationships between contacts across at least two of the plurality of social networks.

15. The method as recited in claim 5, wherein accessing the data in the plurality of social network accounts further comprises storing one or more credentials in a key locker, the credentials being at least one of usernames and passcodes, or authentication tokens associated with the plurality of social network accounts.

16. The method as recited in claim 5, further comprising extracting or linking profile information from at least one of the plurality of social networks into the aggregated social network.

17. The method as recited in claim 16, wherein extracting or linking the profile information is performed using an attribute mapping that maps attributes from the at least one of the plurality of social networks to the aggregated social network.

18. One or more non-transitory computer-readable media storing computer-executable instructions that, when executed on one or more processors, performs acts comprising:

hosting an aggregated social network, the aggregated social network including a communication link associated with data in a plurality of social network accounts and configured to transmit information between the aggregated social network and the plurality of social network accounts, individual social network accounts of the plurality of social network accounts corresponding to an individual social network of a plurality of social networks;

accessing the data in the plurality of social network accounts via the communication link and using credentials that provide access to the plurality of social network accounts;

populating a directory of contacts in the aggregated social network using contacts of a user in the aggregated social network and contacts identified via the communication link and included in the data, the directory of contacts to include relationships of contacts across the plurality of social networks;

presenting an aggregated social network user interface that is configured to provide access to the aggregated social network via the communication link;

receiving, by the aggregated social network user interface and via the communication link, a composed message and an intended recipient,
the composed message composed by the user, and
the intended recipient having connections with the user on at least two social networks of the plurality of social networks;

receiving a selection of a particular social network being one of the at least two social networks on which the user and the intended recipient are connected;

transmitting the composed message to the intended recipient using a messaging mechanism of the particular social network and via the communication link to produce a transmitted message;

creating a message link to data associated with the transmitted message; and storing the message link in the aggregated social network for display via the aggregated social network user interface to at least one of the user or the intended recipient.

19. The one or more non-transitory computer-readable media as recited in claim 18, wherein the acts further comprise determining a reputation score for the user of the aggregated social network based at least in part on one or more of:
a number of contacts of the user in the plurality of social networks, or
an amount of activity by the user in the plurality of social networks and the aggregated social network.

20. The one or more non-transitory computer-readable media as recited in claim 18, wherein the plurality of social networks are accessed using automated scripts that extract data or link data from the plurality of social networks to the aggregated social network.

21. The one or more non-transitory computer-readable media as recited in claim 18, wherein populating the directory of contacts includes joining contacts that are identified as being a same person.

22. A system, comprising:
one or more processors;
one or more memories storing computer executable instructions that, when executed, cause the one or more processors to:

receive credentials that provide access to a plurality of social network accounts, individual social network accounts of the plurality of social network accounts corresponding to an individual social network of a plurality of social networks;

host an aggregated social network, the aggregated social network including a communication link associated with data in the plurality of social network accounts and configured to transmit information between the aggregated social network and the plurality of network accounts;

access the data in the plurality of social network accounts via the communication link and using the credentials;

populate a directory of contacts in the aggregated social network, the directory of contacts including contacts of a user in the aggregated social network and contacts identified using the communication link and included in the data;

present an aggregated social network user interface configured to provide access to the aggregated social network and at least one of the plurality of social network accounts via the communication link;

receive, by the aggregated social network user interface, a composed message and an intended recipient,
the composed message composed by the user, and
the intended recipient having connections with the user on at least two of the plurality of social networks;

receive a selection of a particular social network being one of the at least two social networks on which the user and the intended recipient are connected;

transmit the composed message to the intended recipient using a messaging mechanism of the particular social network and via the communication link to produce a transmitted message;

create a message link to data associated with the transmitted message; and store the message link in the aggregated social network for display via the aggregated social network user interface to at least one of the user or the intended recipient.

23. The system as recited in claim 22, wherein the composed message is a first message, and the computer executable instructions, when executed, further cause the one or more processors to transmit a second message from the aggregated social network user interface to at least one social network associated with one of the contacts using a messaging mechanism of the at least one social network.

24. The system as recited in claim 22, wherein the computer executable instructions, when executed, further cause the one or more processors to calculate a reputation score for the user of the aggregated social network based at least in part on an amount of activity by the user in the plurality of social networks or the aggregated social network.

25. The system as recited in claim 22, wherein the computer executable instructions, when executed, further cause the one or more processors to perform a validation process on the directory of contacts to identify at least one of false positive contacts or fraudulent profiles.

* * * * *